UNITED STATES PATENT OFFICE.

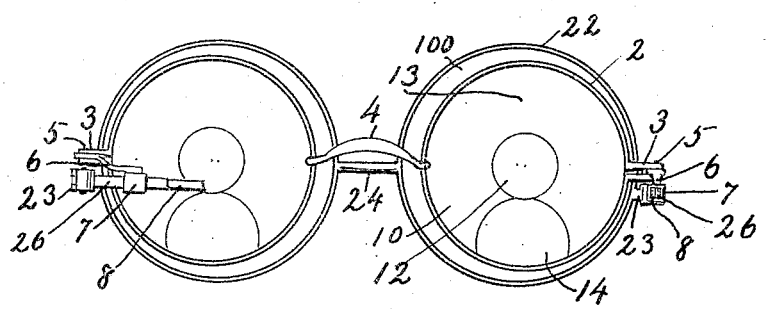
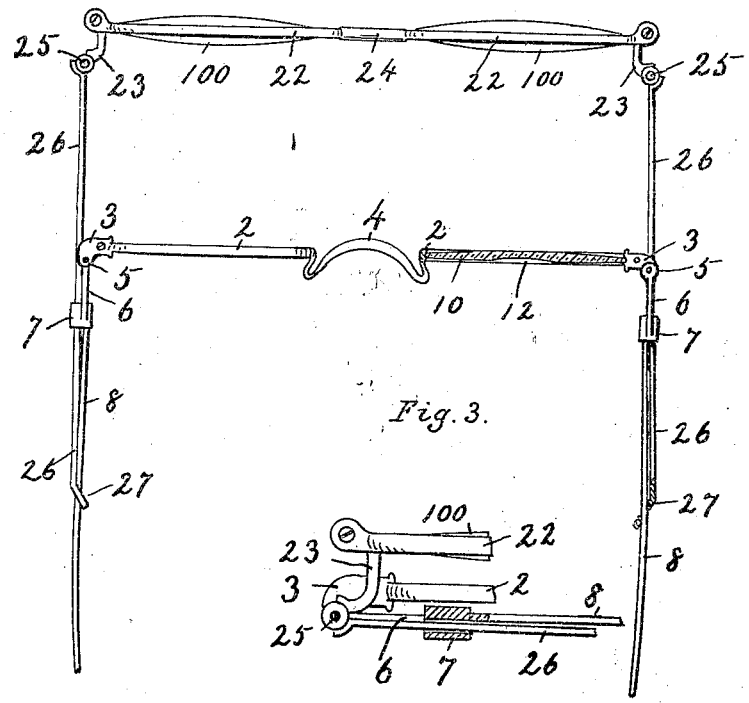
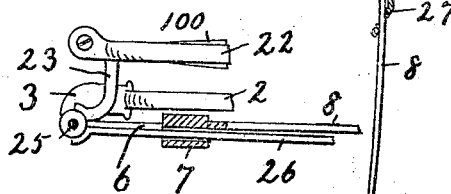

ARTHUR PERRIN, OF BROOKLINE, MASSACHUSETTS.

OPTICAL INSTRUMENT.

1,400,098.  Specification of Letters Patent.  Patented Dec. 13, 1921.

Application filed January 5, 1921. Serial No. 435,138.

*To all whom it may concern:*

Be it known that I, ARTHUR PERRIN, a resident of Brookline, in the county of Norfolk and State of Massachusetts, being a citizen of the United States, have invented an Improvement in Optical Instruments, of which the following description, in connection with the accompanying drawing, is a specification, like reference characters on the drawing representing like parts.

This invention relates to an optical instrument in the nature of an opera glass, or field glass, and is embodied in an instrument of that kind, in which the lenses or optical elements are mounted in spectacle frames, two pairs in tandem arrangement, so that the instrument may be retained supported on the head of the user, leaving the hands free.

The invention consists mainly in novel features of construction of the lens holding and supporting frames with a view to compactness, so that the instrument may be closed and folded and contained in an ordinary spectacle or goggle case when not in use, and in features of optical construction or arrangement which is such that the ordinary vision of the user is practically not interfered with while the instrument is in position before the eyes ready for instant use for telescopic vision.

Figure 1 is an elevation of the instrument as seen when looking toward the eyepiece with the objective and eyepiece elements closed together and with the bow at the left hand folded down, while the bow at the right hand is turned up to the position for use, the bows at both sides being represented as broken away except for a short portion near the pivotal joints or hinges that connect them with the lens holding portion of the frame;

Fig. 2, is a plan view showing the objective and eyepiece elements as separated part way to the position where they focus properly to provide telescopic vision; and, Fig. 3, an enlarged detail showing the joint, or hinge connection of the bows with the lens frames, with the parts closed and folded together, so that they may be properly inclosed in a case of usual size and construction.

Structurally considered the instrument is composed of two main elements, each resembling an ordinary pair of spectacles, the lenses and frames of which are constructed to coöperate so as to constitute, optically considered an opera glass, or binocular telescopic instrument, and for convenience in description, the said main components will be referred to as the front and rear spectacles, although they are not separately suitable for use as such.

The rear spectacle frame is shown as comprising the rims 2, to contain the lenses, the shoulders 3, for connection with the bows, and the bridge 4, to connect the lenses and to afford a support for the instrument on the nose of the user, all of which may be of any suitable or usual construction such as exhibited in ordinary spectacles.

The shoulders 3, are curved or offset to provide for the pivotal attachment at 5, of the bows which are specially constructed as follows:—A short portion 6, is constructed at one end for the hinge connection with the shoulder 3, and is provided, or is rigidly connected with a guide 7, at its outer end, said portion 6, being curved or offset as best shown at the left hand in Fig. 1, so as to bring the guide 7, just above or below the level of the shoulder 3, as appears most clearly at the right hand in Fig. 1. Rigidly connected with said guide 7, is the main portion of the bow 8, which may be made to engage with the sides of the head and over the ears of the user in any suitable or usual way, it being shown at the left hand in Fig. 2, as terminating in a loop or eye connected with an elastic band 9, to pass around the back of the head.

The bows of the rear spectacles thus coöperate with the lenses and with the head of the user in the usual manner, and they may be folded down over the lenses as shown in Fig. 3, the offset in the shoulders 3, accommodating such action.

In the front spectacle frame the lens holding rims 22, may be of usual construction, but the bridge 24, need be only a rigid connection between the rims, as it does not have to rest on the nose of the user.

The pivot shoulders 23, to which the bows 26, are hinged, extend from the rims 22, rearward a distance a little in excess of the thickness of the rear lens frame, and are located below (or it might be above) the level of the shoulders 3, of the rear frame, so that when closed, or with the two frames near together as shown in Figs. 1, and 3, said shoulders 23, extend past the edge of the rear frame, and the hinge joint 25, of the front bows 26, is co-axial with the rear hinge joint 5, as will be understood from Fig. 3, in which the shoulder 23, is shown as above the shoulder 3, instead of below as shown in Fig. 1, it being unimportant which is the upper one of the two shoulders.

The bows 26, of the front spectacles extend through the guides 7 and continue along at the sides of the main portions 8, of the rear spectacles bows, and at their ends, said bows 26 are provided with guides 27, through which the main portions 8, of the rear bows pass, the said guides 7, and 27, providing for and accommodating a sliding movement of the bows 26 relative to the bows 8, in which movement said bows are retained in alinement, and the bows 26, constitute virtually extensions of the bows 8.

Thus when the bows of both frames are unfolded, or turned from the position shown at the left hand in Fig. 1, and in Fig. 3, to the position shown at the right hand in Fig. 1, and in Fig. 2, the front lens frame may be drawn forward from the rear frame while maintaining the substantially co-axial position of the front and rear lenses until they are the proper distance apart to coöperate as a binocular instrument of telescopic character.

The user merely has to apply the rear spectacles by slipping the bows 8, back over the ears and resting the bridge 4, on the nose, as in putting on an ordinary pair of spectacles, and the front spectacles will be supported with their lenses parallel and approximately co-axial with those of the rear spectacles, so that the user may get the conjoint or coöperative effect of the front and rear lenses, constituting an instrument of telescopic character, without the inconvenience usually involved in holding such an instrument in front of the eyes.

When the instrument is to be put away, the front spectacles may be slipped back nearly to the rear ones, thus bringing the pivotal axes 5, and 25, of the hinge joints of the bows of the front and rear spectacles in alinement, or approximately so, when the bows of both spectacles can be turned or folded down on the rear spectacles, and the entire instrument is compact enough to be put in an ordinary case such as is commonly used for spectacles or goggles.

The shoulders 23, may be a little shorter, and the spectacles may be closed a little nearer together than as shown in Fig. 3, but it is desirable to leave a substantial space between the front and rear lenses to reduce liability to frictional contact between them in view of the somewhat flexible character of the material of which spectacle frames are made. For the same reason extreme precision in the positioning of the hinge joints is unnecessary although they should be very nearly co-axial to prevent excessive strain on the frames in the pivotal movement of the bows.

So far as the structural features thus far described are concerned, the lenses, optically considered, might be of any character in which an objective has to be supported parallel with and at a moderate distance from an eyepiece, and the invention, so far as these features are concerned, is not limited to the specific character of the lenses, optically considered, which will now be described.

The lenses 100, in the front spectacles are convex, such as commonly used to produce a magnified image of a distant object seen through them.

The lenses 10, of the rear spectacles have at their middle portion a concave lens 12, such as commonly used as an eyepiece in conjunction with a convex objective to enable the apparently enlarged object to be seen in erect position.

The eyepiece proper 12, occupies only a small area at the middle of each of the rear spectacle lenses 10, the surrounding area of which is suitable for ordinary or normal vision, and when the instrument is adapted for an individual user the rear lenses, except for the small area occupied by the eyepiece at the middle, may be made in conformity with his usual oculist's prescription.

As herein shown the lenses 10, of the rear spectacles are bifocal, the lower middle portion 14, being such as to correct for near vision, or reading, while the remainder is such as to correct for distant vision.

Thus the user by merely turning the eyes downward can see through the portion 14, with customary corrected vision for reading the program, for example, if at a theatrical performance, or for writing notes on an athletic performance or spectacle, while having the opera glass instrument in place for instant use merely by turning the eyes slightly in their sockets as one naturally does in looking up from a book to a distant object. Both hands are also free for holding book or program, manipulating pencil or typewriter, or what not.

If one desires the full field of distant vision it is necessary only to turn the eyes up a little with a slight bowing of the head and one can look through the portion 13, of the lenses 10, with the vision properly corrected thereby and not interfered with by the objectives 100, which are then below the line of sight, although instantly available for telescopic vision by a slight and practically instinctive movement of the eyes and head.

If the eyesight of the user needs no correction, or if the instrument is intended for general use by various different persons, the portion of the rear lenses 10, which surrounds the central eyepiece lens 12, may be made plane, thus affording the customary or ordinary, but uncorrected, vision for any user.

While not deemed so desirable a construction, it is obvious that the lens holding rims 2, may be omitted in either or both of the pairs of spectacles, in which case the bridge pieces and bow pivot shoulders would be secured directly to the lenses as in the familiar so-called rimless construction, in which the lenses themselves constitute a part of the spectacle frames, and the invention so far as it relates to the optical character of the lenses is not limited to the frame construction herein shown and described.

I claim:—

1. An optical instrument comprising front and rear spectacle frames, containing objective and eyepiece lenses respectively, said frames each having bows hinged thereto, and the bows of the respective frames being connected by guides which accommodate a relative sliding movement by which the objectives may be moved toward and from the eyepieces while retained parallel and substantially coaxial therewith, the shoulders to which said bows are hinged having the pivotal axes of the bows of the respective frames substantially in line with one another when the front and rear frames are closed together, whereby the connected bows of both frames can be folded down parallel with the plane of the lenses.

2. In an optical instrument, front and rear spectacle frames containing objective and eyepiece lenses respectively, said rear frame having bows pivotally connected therewith consisting of short hinge portions having guides at their outer ends and main bow portions extending therefrom, said guides and main bow portions being offset relative to the hinged ends; and said front frame having bows hinged thereto in line with and extending through the offset guides and along at the side of the offset main portion of the rear frame bows, said front frame bows constituting an adjustable prolongation of the rear frame bows for supporting the objective lenses parallel with and at the desired distance from the eyepiece lenses.

3. In an optical instrument, front and rear spectacle frames containing objective and eyepiece lenses respectively, said rear frame having bows pivotally connected therewith consisting of short hinge portions having offset guides and main bow portions at the outer ends thereof; and said front frame having pivot shoulders and bows hinged thereto, at the level of the guides of the rear frame bows, and the hinge joints of the front frame bows being adapted to be placed with their axes in alinement with the axes of the rear frame bow hinges, said front frame bows extending through the guides and along at the sides of the main bow portions of the rear frame, and being provided at their ends with guides embracing the said rear frame main bow portions.

4. In an optical instrument, front and rear spectacle frames comprising means for supporting said frames on the head of the user, the front frame containing objective lenses, and the rear frame containing lenses the middle portion of the area of each of which constitutes an eyepiece to coöperate with the corresponding obective, and the surrounding portion of which is adapted for the customary vision of the user.

ARTHUR PERRIN.